US 6,619,336 B2

(12) United States Patent
Cohen et al.

(10) Patent No.: US 6,619,336 B2
(45) Date of Patent: Sep. 16, 2003

(54) SYSTEM AND METHOD FOR DISPENSING PRESSURIZED GAS

(75) Inventors: Joseph Perry Cohen, Bethlehem, PA (US); David John Farese, Riegelsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 8 days.

(21) Appl. No.: 10/075,890

(22) Filed: Feb. 14, 2002

(65) Prior Publication Data

US 2003/0150510 A1 Aug. 14, 2003

(51) Int. Cl.[7] .................................................. B65B 1/44
(52) U.S. Cl. ......................... 141/83; 141/4; 141/18; 141/98; 141/82; 141/95
(58) Field of Search ................................ 141/4, 18, 37, 141/82, 83, 94, 95, 98

(56) References Cited

U.S. PATENT DOCUMENTS

| | | | |
|---|---|---|---|
| 3,837,377 A | 9/1974 | McJones | 141/4 |
| 4,515,516 A | 5/1985 | Perrine et al. | 417/38 |
| 4,527,600 A | 7/1985 | Fisher et al. | 141/4 |
| 4,966,206 A | 10/1990 | Baumann et al. | 141/83 |
| 4,984,457 A | 1/1991 | Morris | 73/149 |
| 5,029,622 A | 7/1991 | Mutter | 141/4 |
| 5,156,198 A | 10/1992 | Hall | 141/94 |
| 5,169,295 A | 12/1992 | Stogner et al. | 417/339 |
| 5,238,030 A | 8/1993 | Miller et al. | 141/4 |
| 5,259,424 A | 11/1993 | Miller et al. | 141/4 |
| 5,454,408 A | 10/1995 | DiBella et al. | 141/197 |
| 5,628,349 A | 5/1997 | Diggins et al. | 141/3 |

Primary Examiner—Gregory Huson
Assistant Examiner—Peter deVore
(74) Attorney, Agent, or Firm—Keith D. Gourley

(57) ABSTRACT

A system for dispensing pressurized gas is provided which includes a pressurized gas source, a receiving tank, a gas flow line connected between the gas source and the receiving tank, a valve for initiating and terminating flow of gas between the gas source and the receiving tank, an electronic controller, and temperature and pressure sensors for sensing temperature and pressure of gas inside the receiving tank. The electronic controller stores a tank rated density and the temperature and pressure of gas and periodically calculates a density of the gas in the receiving tank based on the temperature and pressure. The electronic controller periodically compares the density of the gas with the tank rated density and initiates flow of gas through the valve when the density in the receiving tank is below the rated density and terminates flow of gas through the valve when the density reaches the tank rated density.

19 Claims, 6 Drawing Sheets

SYSTEM AND METHOD FOR DISPENSING PRESSURIZED GAS

BACKGROUND OF THE INVENTION

The present invention is directed to a pressurized gas dispensing system. More particularly, the present invention is directed to a method and apparatus useful for transferring a gas from a refueling station into one or more storage tanks.

Because of the interrelationship between the temperature, pressure and density of gases, the amount of hydrogen, $H_2$, (or compressed natural gas (CNG)) that can safely be introduced into a storage tank, such as a vehicle storage tank, during refueling necessarily depends upon factors such as the volume, design pressure, and temperature of the tank, and the temperature and pressure of the gas inside the tank. Industry convention sets the pressure rating for $H_2$ fuel tanks at the standard temperature of 15 degrees Celsius, so nominal pressure ratings such as 250 bar, 350 bar, 500 bar and 700 bar, correspond to an internal gas temperature of 15 degrees Celsius. During rapid refueling, the internal tank temperature will typically rise about 50 degrees Celsius due to adiabatic compression of the gas and the reverse Joule-Thompson effect. After the tank is filled, the temperature and pressure inside the tank will decrease as the gas cools. Wide variations in ambient temperature above or below the standard condition of 15 degrees Celsius can also have a significant effect on the indicated pressure inside the tank during and after refueling.

Prior art refueling systems have used various devices and methods for regulating the cutoff pressure and for determining the amount of gas dispensed when refilling vehicle storage tanks. For example, U.S. Pat. No. 3,837,377 (McJones) discloses a means for sensing the pressure of a given amount of reference gas contained in a closed, reference pressure vessel that is in thermal contact with the tank being filled. Gas is charged into the tank and the pressure in both the reference vessel and the tank are monitored and compared. Refueling is terminated whenever there is a predetermined pressure differential between the gases in the reference vessel and the tank. The use of an internal reference vessel increases fabrication and installation costs and also presents an ongoing maintenance problem with regard to checking the integrity of the reference vessel. If the reference vessel leaks, there is no way to verify that the reference pressure is correct and has not changed. Also, the use of a reference vessel as disclosed in U.S. Pat. No. 3,837,377 (McJones) will not provide a desirably quick response time in that the gas flow rate will be gradually lowered as the receiving tank pressure begins to approach the reference pressure.

U.S. Pat. No. 4,527,600 (Fisher et al.) discloses a CNG dispensing system comprising a relatively high pressure storage tank from which CNG flows through a control valve, pressure regulator and flow sensing transducer to the tank being filled. Temperature and pressure transducers in the storage tank transmit electric signals to a process control electronic control that calculates the volume of gas dispensed by comparing the initial and final values of the CNG inside the storage tank. A differential pressure cell communicating with the storage tank and with the vehicle tank fill line generates a signal that is used by the electronic control to operate a solenoid-controlled valve disposed in the fill line. Flow continues until pressure in the vehicle storage tank reaches a preselected set point, causing the regulator to close. The regulator set point is not, however, adjusted according to the temperature inside the vehicle tank.

U.S. Pat. No. 5,029,622 (Mutter) discloses a gas refueling device and method of operation wherein at least one temperature sensor is utilized for sensing the temperature of ambient air external to the refueling device. An advantage of this refueling device is disclosed to be that set/actual value comparisons between pressures and temperatures are carried out at short time intervals, with the permissible set values corrected according to the development of the preceding measurements. Here again, however, the temperature inside the vehicle storage tank is not monitored during refueling.

U.S. Pat. No. 4,966,206 (Bauman et al.) discloses another device for refilling tanks with CNG that automatically adjusts the filling pressure of the gaseous fuel to the local ambient temperature. A temperature sensor is disposed outside the casing of the device for generating a signal in response to ambient temperature. A pressure sensor is connected to the suction line of the compressor for generating a signal in response to the gas inlet pressure. A pressure difference sensor is also provided for generating a signal in response to a difference in pressure between the fuel pressure in the inlet line of the casing and the pressure inside the casing. A control device disposed in the casing is connected to each of the three sensors in order to receive signals from each. This control device is also connected to the inlet valve and discharge valve in order to control the inlet valve and discharge valve in response to the signals received from the sensors.

U.S. Pat. No. 5,238,030 (Miller et al.) discloses a pressurized fluid dispensing system that can automatically compensate for non-standard ambient gas temperature to promote complete filling of a pressurized storage tank. Pressure and temperature transducers connected to a supply plenum measure the stagnation pressure and temperature of the CNG, and a pressure transducer in fluid communication with the vehicle tank via the dispensing hose assembly is used to determine the pressure in the vehicle tank. A second temperature transducer is used to measure the ambient temperature. An electronic control system connected to the pressure and temperature transducers and to the control valve assembly calculates a vehicle tank cut-off pressure based on the ambient temperature and on the pressure rating of the vehicle tank that has been preprogramed into the electronic control system and automatically turns off the CNG flow when the pressure in the vehicle tank reaches the calculated cut-off pressure. U.S. Pat. No. 5,259,424 (Miller et al.), which is related to U.S. Pat. No. 5,238,030 (Miller et al.), discloses a similar system in which the pressure transducer is used to determine the discharge pressure. An electronic control system calculates the volume of the vehicle tank and the additional mass of CNG required to increase the tank pressure to the cut-off pressure. The CNG flow is turned off when the additional mass has been dispensed into the vehicle tank.

U.S. Pat No. 5,628,349 (Diggins) discloses a system for dispensing pressurized gas in which temperature inside a receiving tank is monitored and is used by a computer to adjust fill pressure to compensate for temperature and pressure rise attributable to adiabatic compression of gas inside the receiving tank. The system here uses the pressure and temperature of the receiving tank to calculate gas volume inside the tank. Actual tank pressure and gas volume are compared to an estimated tank finish pressure and corresponding gas volume for the tank.

Several other patents include are cited herein for background information only. These include the following. U.S. Pat. No. 4,515,516 (Perrine et al.) discloses a method and apparatus for compressing gases. The compressor used here is suited for filling a natural gas storage tank in a vehicle over an extended period of several hours. An auxiliary storage tank is used for fast filling. U.S. Pat. No. 4,984,457 (Morris) discloses a tank gauging apparatus and method for gauging the amount of liquid in a container of liquid and gas under flow or zero gravity conditions. U.S. Pat. No. 5,156,198 (Hall) discloses a fuel pump lock and dispensing system wherein data from a vehicle computer is used to identify the vehicle, transfer data to and from the vehicle computer to a fuel pump computer, and to unlock the fuel pump. U.S. Pat. No. 5,169,295 (Stogner et al.) discloses a method and apparatus for compressing gas where two accumulators are alternately filled with gas from a gas supply and the gas is forced out of one end of each of the accumulators into a gas-receiving conduit by liquid forced into the other end of each of the accumulators. U.S. Pat. No. 5,454,408 (DiBella et al.) discloses a variable volume CNG storage vessel connected to a line supplying pressurized natural gas. The vessel connects to a dispensing station fitting. When a tank is being filled, a controller responds to pressure within the storage vessel to vary the volume of the storage vessel.

BRIEF SUMMARY OF THE INVENTION

A system for dispensing pressurized gas is provided which includes a pressurized gas source, a receiving tank, a sealed gas flow line connected between the gas source and the receiving tank, a valve in the gas flow line for initiating and terminating flow of the pressurized gas between the gas source and the receiving tank operable by a valve signal, and an electronic controller. A temperature sensor is also included for sensing temperature of a gas inside the receiving tank which includes a temperature signal generator for generating a temperature signal corresponding to the temperature of the pressurized gas in the receiving tank. The temperature signal is used by the electronic controller. Likewise, a pressure sensor for sensing pressure of a gas inside the receiving tank is included which includes a pressure signal generator for generating a pressure signal corresponding to the pressure of the gas inside the receiving tank. The pressure signal is also used by the electronic controller. The electronic controller stores a tank rated density and the temperature and pressure signals. The electronic controller also periodically calculates density of the gas in the receiving tank based on the temperature and pressure signals. The electronic controller compares the density of the gas in the receiving tank with the tank rated density and initiates flow of pressurized gas through the valve by generating a valve signal when the density of gas in the receiving tank is below the tank rated density and terminates flow of pressurized gas through the valve by generating a valve signal when the density of the gas in the receiving tank reaches the tank rated density.

Preferably, the pressurized gas is hydrogen gas. Preferably, the electronic controller generates a percent full signal, where the percent full signal is the ratio of the density of gas in the receiving tank to the tank rated density.

A refrigeration system for cooling the gas exiting the pressurized gas source prior to the gas entering the receiving tank may also be included. Here, the refrigeration system may use a mechanical refrigeration cycle, for example, using a hydrofluorocarbon. Alternatively, the refrigeration system may include a liquid hydrogen source and a cold storage device, wherein the cold storage device is cooled by hydrogen from the liquid hydrogen source and the refrigeration system also includes a heat exchanger adapted to receive and cool gas exiting the pressurized gas source prior to its flowing to the receiving tank. The cold storage device may use a condensable refrigerant to store the refrigeration until cooling is needed when filling the receiving tank. Again, the refrigerant may be a hydrofluorocarbon. The cold storage device may also use a compressed gas such as argon or nitrogen. The refrigeration system may include a refrigerated container that at least partially surrounds the pressurized gas source.

Finally, the electronic controller may calculate the density of the gas in the receiving tank based on estimates of the temperature and pressure signals.

A method for dispensing pressurized gas is also provided which includes the steps of providing a pressurized gas source, a receiving tank, a sealed gas flow line connected between the gas source and the receiving tank, and a valve in the gas flow line for initiating and terminating flow of the pressurized gas between the gas source and the receiving tank operable by a valve signal. The method also includes the step of providing an electronic controller, a temperature sensor for sensing temperature of a gas inside the receiving tank, and a pressure sensor for sensing pressure of a gas inside the receiving tank. The temperature sensor includes a signal generator for generating a temperature signal corresponding to the temperature of the pressurized gas in the receiving tank. The temperature signal is adapted to be received by the electronic controller. The pressure sensor also includes a signal generator for generating a pressure signal corresponding to the pressure of the gas inside the receiving tank. The pressure signal is adapted to be received by the electronic controller. The method further includes the steps of storing a tank rated density and pressure signals in the electronic controller, periodically calculating a density of the gas in the receiving tank based on the temperature and pressure signals, and periodically comparing the density of the gas in the receiving tank with the tank rated density. Flow of pressurized gas through the valve is initiated by generating the valve signal when the density of gas in the receiving tank is below the rated density, and flow of pressurized gas through the valve is terminated by generating the valve signal when the density of the gas in the receiving tank reaches the rated density. The method may further include the step of generating a percent full signal, wherein the percent full signal is the ratio of the density of gas in the receiving tank to the rated density. The method may further include the step of cooling the gas exiting the pressurized gas source prior to the gas entering the receiving tank using a refrigeration system. The step of cooling may include using a liquid hydrogen source. The step of calculating the density of the gas in the receiving tank may be based on estimated temperature and pressure signals. The step of calculating the density of the gas in the receiving tank may include obtaining temperature sensor and pressure sensor readings by calculating estimated values based on an estimate of density and flow of gas exiting the pressurized gas source.

DETAILED DESCRIPTION OF THE INVENTION

Figure 1:
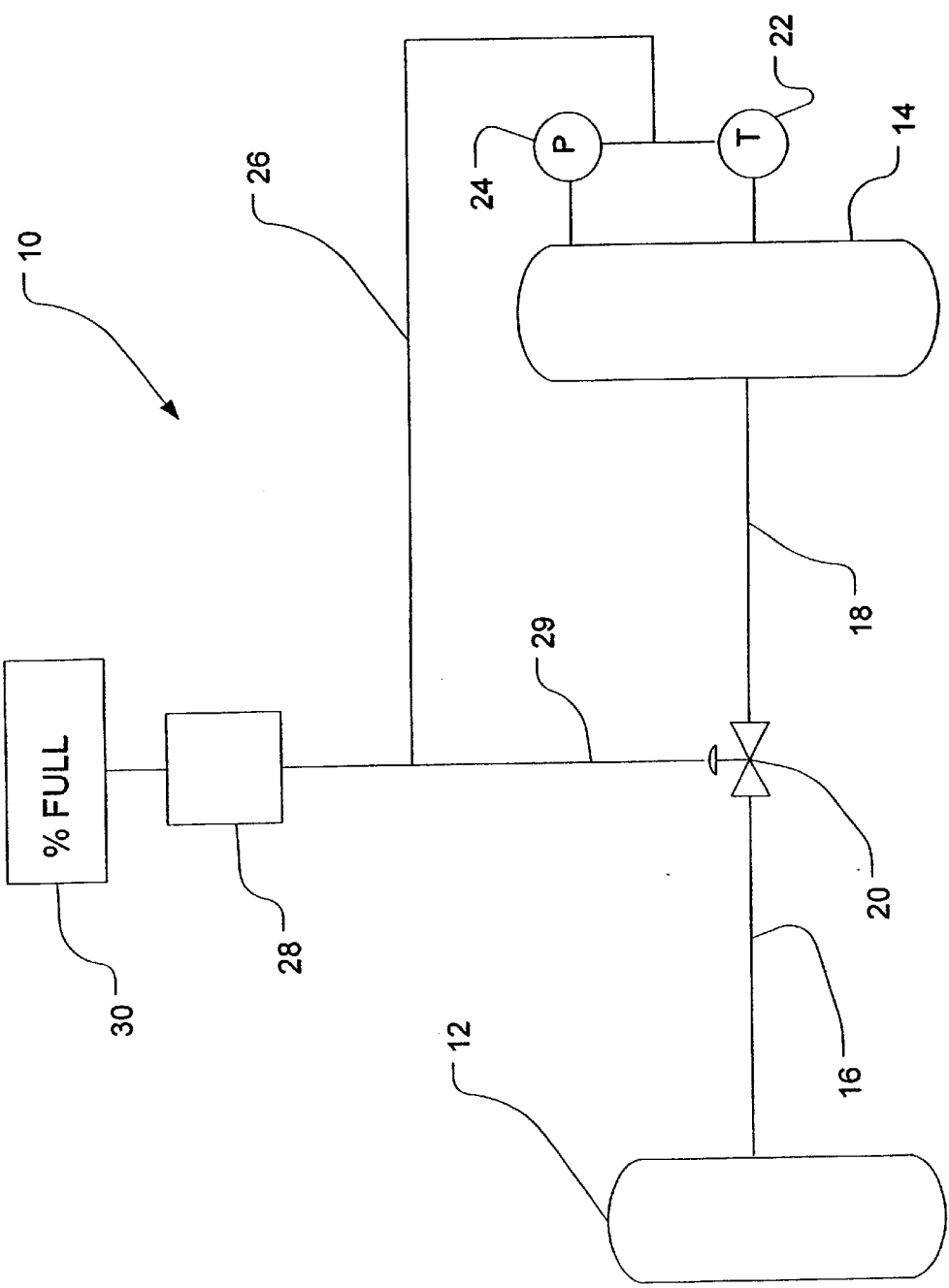
FIG. 1 is a simplified schematic view of one preferred embodiment of the system for dispensing pressurized gas of the present invention.

Referring now to the drawings, wherein like reference numbers refer to like elements throughout the several views, there is shown in FIG. 1, a system for dispensing pressurized gas 10 in accordance with one preferred embodiment of the present invention. The system for dispensing pressurized gas 10 preferably comprises a pressurized gas source 12 connected to a receiving tank 14 through a sealed, pressurized gas flow line 16. The sealed gas flow line 16 is connected to the receiving tank 14 via a connector assembly 18 which includes any required fuel line and a gas supply valve 20 to control the flow of pressurized gas between the gas source 12 and the receiving tank 14. A temperature sensor such as temperature transducer 22 is preferably disposed inside the receiving tank 14 that includes a temperature signal generator that generates a signal indicating the temperature of the gas inside the receiving tank 14. For purposes of this specification, the temperature sensor 22 must sense temperature within the receiving tank 14, however, the temperature sensor 22 itself need not be located inside the receiving tank 14. For example, the temperature sensor 22 may be located in or on the connector assembly 18, or an interior or exterior wall of the receiving tank 14. If necessary, a correction factor may be used to calculate the actual temperature in the tank based on the temperature at the temperature sensor 22. A pressure sensor such as pressure transducer 24 is also disposed inside the receiving tank 14 as shown (or other location having the same or similar pressure such as the connector assembly 18) that includes a pressure signal generator that generates a signal indicating the pressure of the gas in the receiving tank 14. For purposes of this specification, the pressure sensor 24 must sense pressure within the receiving tank, however, the pressure sensor 24 itself need not be located inside the receiving tank 14. For example, the pressure sensor 24 may be located in the connector assembly 18. If necessary, a correction factor may be used to calculate the actual pressure in the receiving tank 14 based on the at the pressure at the pressure sensor 24. The system for dispensing pressurized gas 10 also preferably includes a signal connection 26, an electronic controller 28 and a display 30. The electronic controller 28 generates a valve signal 29 that controls opening and closing of the valve 20.

It should be understood for purposes of the present invention that the pressurized gas source 12 can include both "rapid-fill" and "slow-fill" sources. The term "rapid-fill" is generally understood to apply to fill rates exceeding about 0.5 kg/min. per tank, while the term "slow-fill" is generally understood to apply to fill rates below 0.5 kg/min per tank.

Methods for connecting the system to the vehicle, and for communication with the vehicle are shown, for example, in U.S. Pat. No 5,628,349 (Diggins), the complete specification of which is hereby incorporated by reference.

A significant feature of the present invention is the use of the temperature signal 22 (that indicates the temperature of the gas inside the receiving tank 14) used in combination with the pressure signal 24 (that indicates the pressure of the gas inside the receiving tank), by electronic controller 28 to calculate a density of gas in the receiving tank 14.

Calculation of density inside receiving tank 14 offers several advantages over systems in the prior art. With the system 10 disclosed herein, the density of gas inside receiving tank 14 is compared periodically to a tank rated density (based on a tank rated temperature at a tank rated pressure) of the full receiving tank 14 by the electronic controller 28 based upon the actual temperature of the gas inside receiving tank 14. The tank rated pressure and tank rated temperature (or tank rated density) are based on the receiving tank specifications, for example, a manufacturer's specification, for a full tank. Therefore, the process can be controlled such that at no time during the dispensing cycle does the actual pressure inside the receiving tank exceed the manufacturer's maximum allowable pressure for that tank.

The signal from temperature transducer 22 is relayed to electronic controller 28 by, for example, any conventional, commercially available devices or systems as desired.

Figure 2:
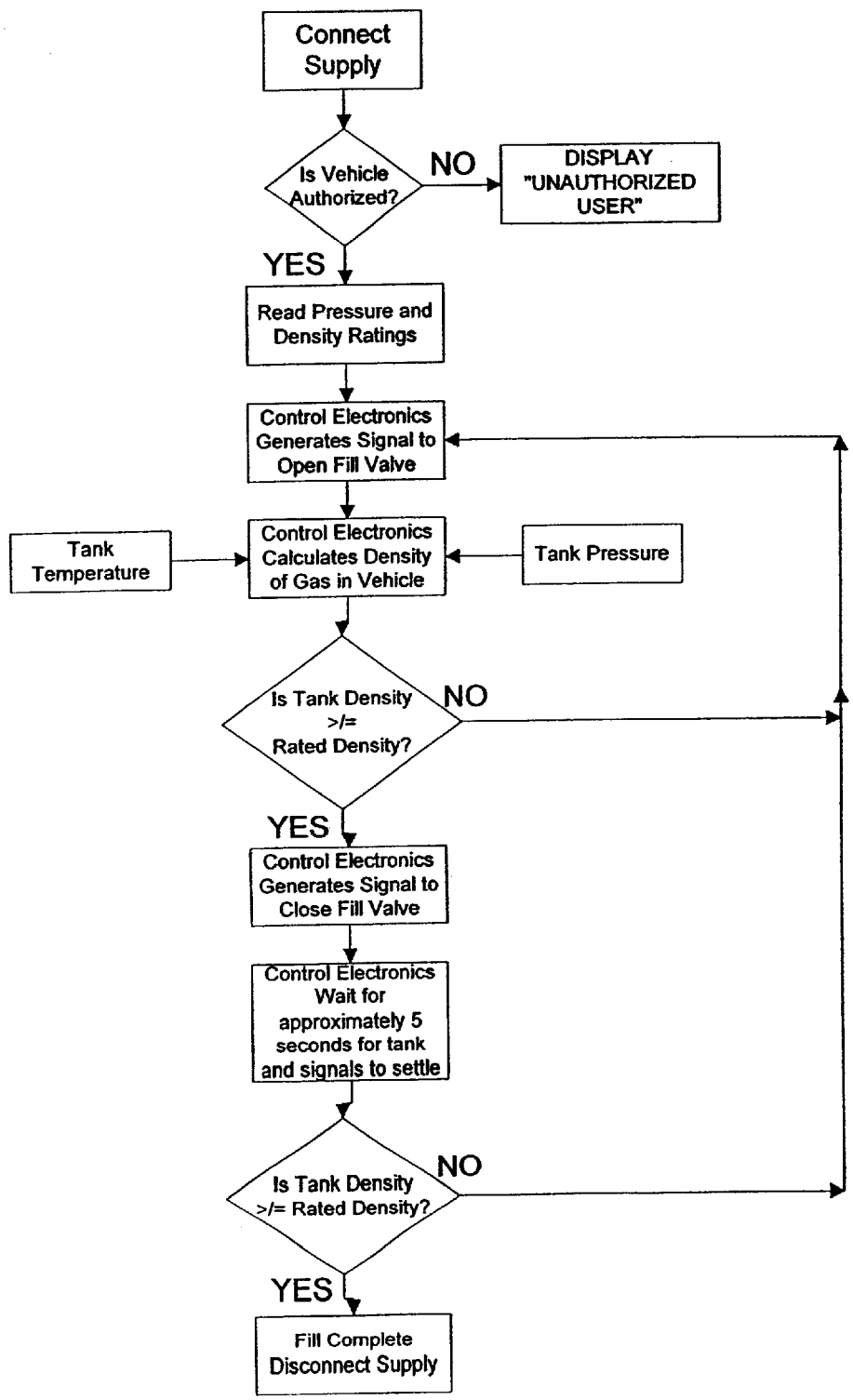
FIG. 2 is a simplified block flow diagram illustrating the preferred method of using the system for dispensing pressurized gas of FIG. 1.

The method of the invention is further explained in the system flowchart of FIG. 2 which depicts the control of the system 10 previously described with regard to FIG. 1. Once the gas flow line 16 is connected to the receiving tank 14 via connector assembly 18, electronic controller 28 authorizes the use of the station for an authorized user by any number of commonly used methods such as a credit debit card, or other magnetic or electronically encoded card, with our without an identifying "PIN" number. If the electronic controller 28 determines that a user is not an authorized user, it sends a message such as "Unauthorized User" to the display 30. After authorization is confirmed by the electronic controller, it reads the rated pressure and density of the gas in the receiving tank 14. The electronic controller 28 causes control valve 20 to open, via a valve signal, and allows pressurized gas to flow from the pressurized gas source 12 through gas flow line 16 to the receiving tank 14.

During the refilling of receiving tank 14, temperature transducer 22 and pressure transducer 24 continue to forward real time temperature and pressure data to the electronic controller 28, which repeatedly recalculates the gas volume density inside receiving tank 14, for examples, several times a second. Electronic controller 28 compares the density calculated from the real time temperature and pressure inside receiving tank 14 with the rated density. If the tank pressure is not yet within that range, rapid filling continues and electronic controller 28 reads the new real time temperature and pressure data and calculates the density of gas inside receiving tank 14, repeating the foregoing steps.

If, on the other hand, the density in receiving tank 14 is already greater than or equal to the rated density (minus a tolerance, for example, 1%), electronic controller 28 then signals valve 20 to halt the flow of gas, via the valve signal, and waits for, for example, 1 to 60 seconds and preferably five seconds while the tank and the instrumentation settle. If the density is still greater than or equal to the rated density (minus the tolerance), then filling is complete. If the density is less than the rated density, filling again resumes, as above.

Preferably, the electronic controller generates a percent full signal, where the percent full signal is the ratio of the density of gas in the receiving tank to the tank rated density, wherein the density of gas in the receiving tank is based on the temperature and pressure signals.

Figure 3:
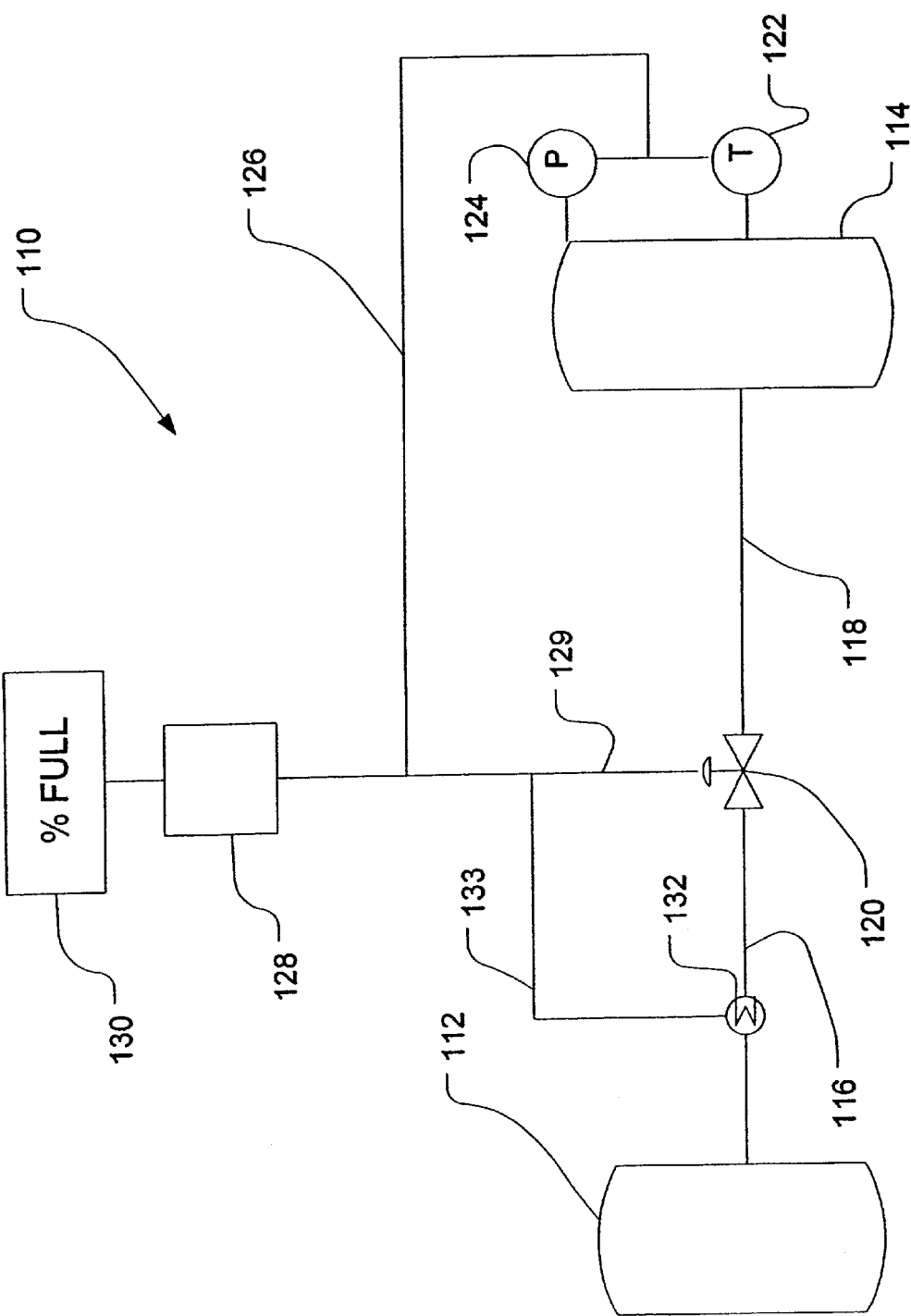
FIG. 3 is a simplified schematic view of another preferred embodiment of the system for dispensing pressurized gas, where the gas is cooled before delivery to a receiving tank.

Referring now to FIG. 3, there is shown an alternate embodiment of the present invention. Here, the system for dispensing pressurized gas 110 preferably comprises pressurized gas source 112 connected to a receiving tank 114 through a pressurized gas flow line 116. The gas flow line 116 is connected to the receiving tank 114 via a connector assembly 118 which includes a gas supply valve 120 to control the flow of pressurized gas between gas source 112 and receiving tank 114. A temperature transducer 122 is disposed inside the receiving tank 114 that generates a signal indicating the temperature of the gas inside the receiving tank 114. A pressure transducer 124 disposed inside the receiving tank 114 generates a signal indicating the pressure of the gas in the receiving tank 114. The system for dispensing pressurized gas 110 also preferably includes a signal connection 126, an electronic controller 128 and display 130. These elements are all in common with the first embodiment of the system for dispensing pressurized gas 10, as discussed above.

An additional significant feature of the second embodiment of the system for dispensing pressurized gas 110 is its ability to remove heat from the gas in the gas flow line 116 (between the pressurized gas source 112 and the receiving tank 114 with any applicable commonly known source of refrigeration 132. The source of refrigeration 132 is connected to the electronic controller 128 via refrigeration control line 133. The source of refrigeration 132 preferably lowers the temperature of the gas in the receiving tank 114 as it is being filled as compared to filling without refrigeration. Optimally, the source of refrigeration 132 keeps the temperature of the gas in the receiving tank 114 during and immediately after filling at the ambient temperature of the receiving tank 114 prior to filling.

Figure 4:
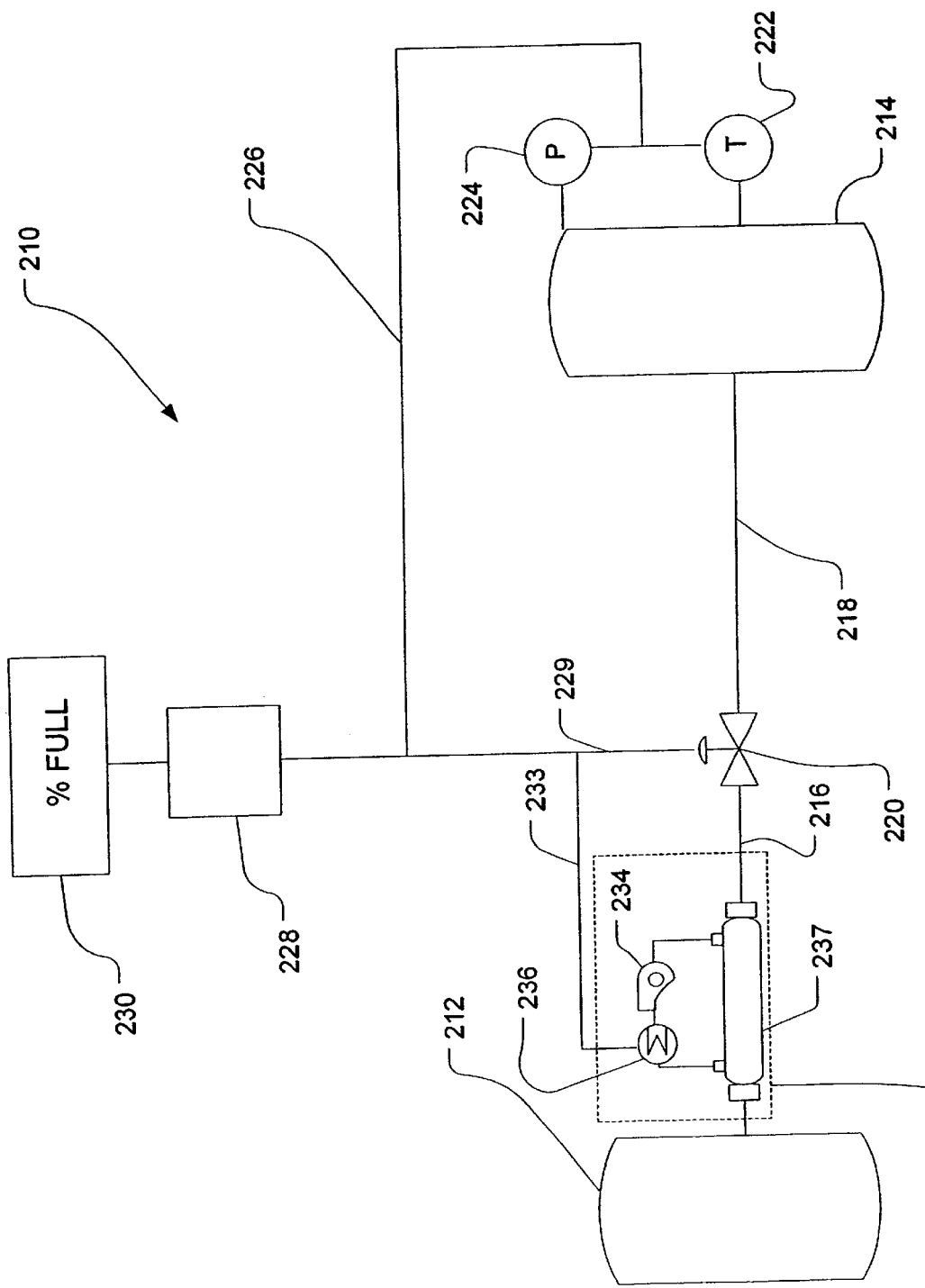
FIG. 4 is a simplified schematic view of another preferred embodiment of the system for dispensing pressurized gas where the gas is cooled by an independent cooling system, such as a hydrofluorocarbon cycle system, before delivery to a receiving tank.
Figure 5:
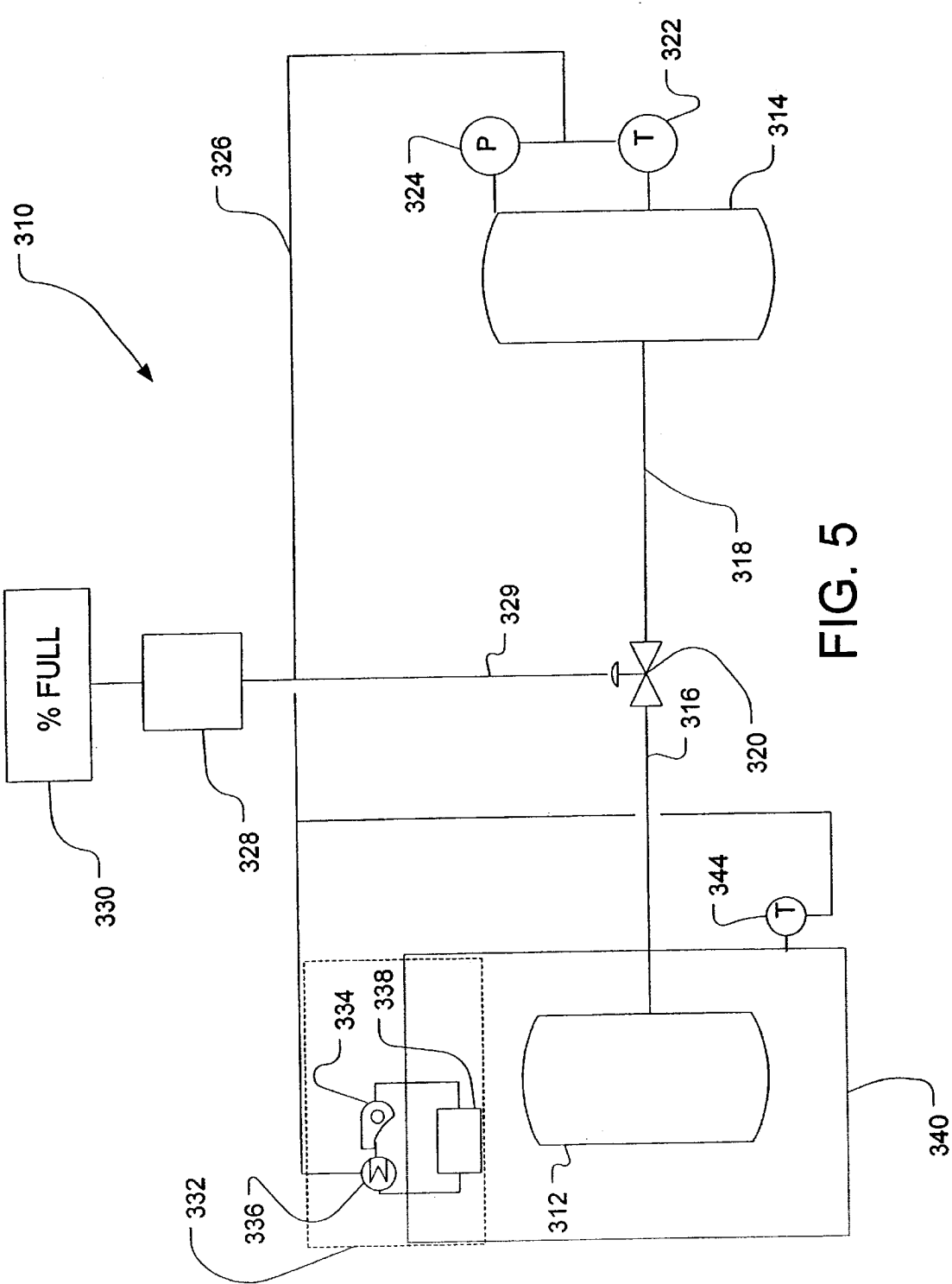
FIG. 5 is a simplified schematic view of another preferred embodiment of the system for dispensing pressurized gas where the gas is cooled while it is stored as a pressurized gas by an independent cooling system, such as a hydrofluorocarbon cycle system, before delivery to a receiving tank.
Figure 6:
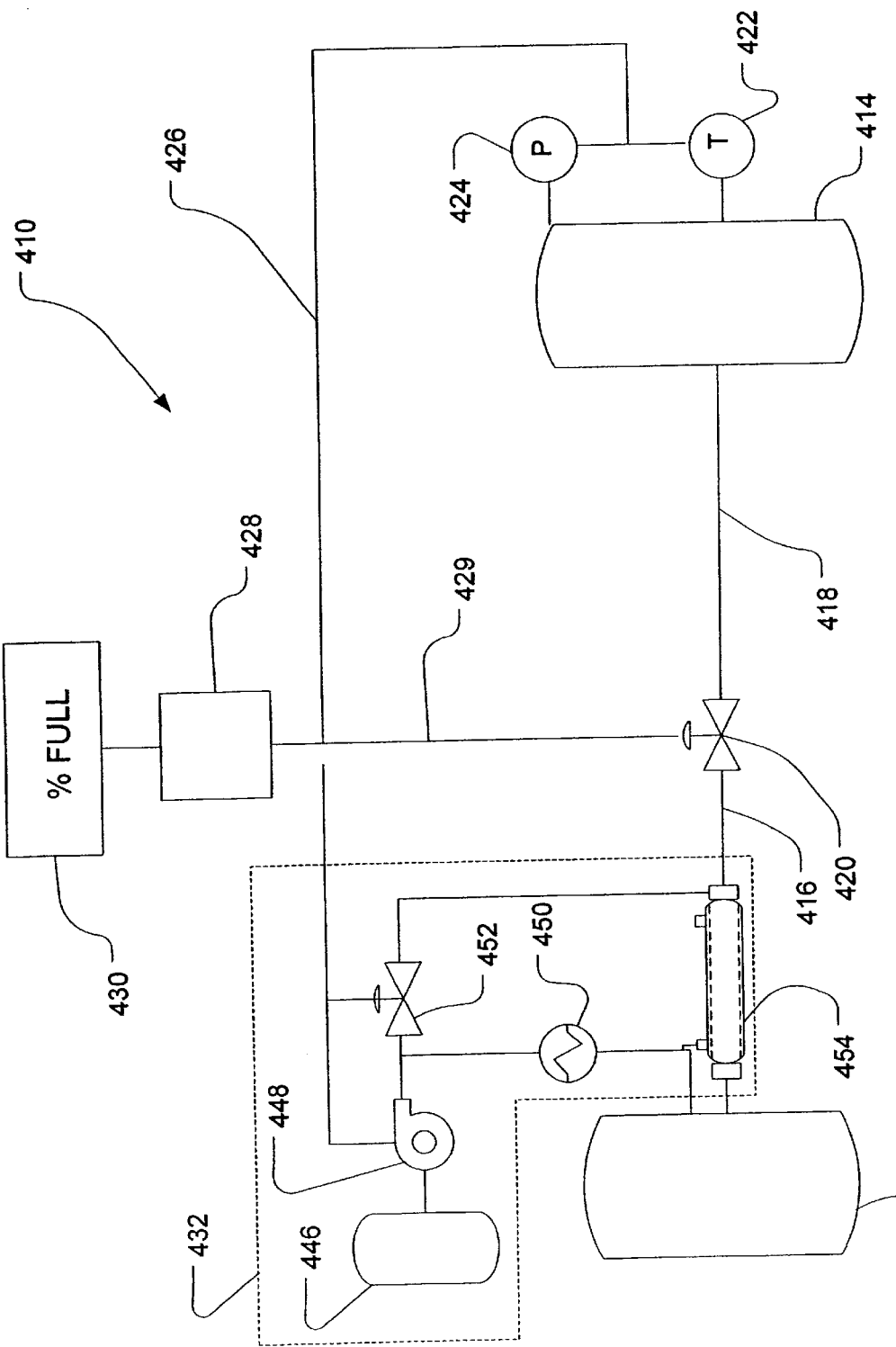
FIG. 6 is a simplified schematic view of another preferred embodiment of the system for dispensing pressurized gas where the gas is cooled using refrigeration from liquid hydrogen which has been stored before delivery to a receiving tank.

FIGS. 4–6 depict examples of several preferred means of refrigeration for use with the present invention. As can be seen in FIG. 4, there is shown a system for dispensing pressurized gas 210. The system 210 is identical to the system 110 except that one specific embodiment of the refrigeration system 232 is shown in detail. In the interest of brevity, the common structural details of the systems 110 and 210 will be given the similar reference numbers as seen and their construction and operation will not be reiterated. For example, pressurized gas source 112 in the system 110 is identical to the pressurized gas source 212 in the system 210. In the system 210, a refrigeration system 232 having a typical external refrigeration cycle (such as a hydrofluorocarbon cycle, for example, HCFC 134A) with a recirculating pump 234, a means to remove heat from the heat exchange fluid 236 and a heat exchanger 237.

As can be seen in FIG. 5, there is shown a system for dispensing pressurized gas 310. The system 310 is identical to the system 110 except that one specific embodiment of the refrigeration system 332 is shown in detail. In the interest of brevity, the common structural details of the systems 110 and 310 will be given the similar reference numbers as seen and their construction and operation will not be reiterated. For example, pressurized gas source 112 in the system 110 is identical to the pressurized gas source 312 in the system 310. The pressurized gas source 312 is located either partially or entirely in a refrigerated container 340. Refrigeration is provided using a conventional refrigeration system 332 providing cold to air heat exchanger 338 located in the refrigerated container 340. The temperature in the container 340 is controlled by the electronic controller 328 using data from a temperature sensor 344.

Finally, as can be seen in FIG. 6, there is shown a system for dispensing pressurized gas 410. The system 410 is identical to the system 110 except that one specific embodiment of the refrigeration system 432 is shown in detail. In the interest of brevity, the common structural details of the systems 110 and 410 will be given the similar reference numbers as seen and their construction and operation will not be reiterated. For example, pressurized gas source 112 in the system 110 is identical to the pressurized gas source 412 in the system 410. Here, a source of liquid hydrogen is used. The liquid hydrogen is stored in vessel 446. The liquid hydrogen is pumped using a cryogenic pump 448. Some of the hydrogen is pumped directly into a heat exchanger 450 where the liquid is warmed up to be converted to a gas and is and placed in the pressurized gas source 412. The rest of the hydrogen goes through a control valve 452, and into a cold storage device 454 that includes a heat exchanger, wherein the cold is stored in the cold storage device 454 until needed, wherein gas exiting the pressurized gas source 412 passes through the heat exchanger in the cold storage device 454 to cool the gas that will be delivered to the receiving tank 114. The cold storage device 454 preferably uses a condensable refrigerant to store the refrigeration until cooling is needed when filling the receiving tank.

Finally, it is noted that with respect to the multiple embodiments discussed herein, the temperature and pressure sensors may be based on calculated or estimated values rather than direct measurements from the receiving tank.

Although a principle use of the system and method of the invention is for refueling vehicle storage tanks with compressed hydrogen, the present system is similarly useful for refilling other types of gas storage tanks with pressurized gas, such as CNG.

The pressurized gas source of the various embodiments of the present invention may be a large volume storage tank, a pressurized gas supply line, a compressor discharge line, or any combination of these elements suitable for use in supplying gas to the receiving tank in an amount and at a pressure great enough to achieve a desired fill rate, fill level, and pressure in the receiving tank. A particularly preferred pressurized gas source for supplying pressurized gas to receiving tank is a system as shown and described in U.S. Pat. No. 5,351,726 (Diggins), which is fully incorporated by reference herein.

Although illustrated and described herein with reference to specific embodiments, the present invention nevertheless is not intended to be limited to the details shown. Rather, various modifications may be made in the details within the scope and range of equivalents of the claims without departing from the spirit of the invention.

What is claimed is:

1. A system for dispensing pressurized gas, comprising:
   (a) a pressurized gas source;
   (b) a receiving tank;
   (c) a sealed gas flow line connected between said gas source and said receiving tank;
   (d) a valve in said gas flow line for initiating and terminating flow of the pressurized gas between the gas source and the receiving tank, said valve operable by a valve signal;
   (e) an electronic controller;
   (f) a temperature sensor, said temperature sensor for sensing temperature of a gas inside the receiving tank, said temperature sensor including a temperature signal generator for generating a temperature signal corresponding to the temperature of the pressurized gas in the receiving tank, said temperature signal adapted to be received by the electronic controller;

(g) a pressure sensor, said pressure sensor for sensing pressure of a gas inside the receiving tank, said pressure sensor including a pressure signal generator for generating a pressure signal corresponding to the pressure of the gas inside the receiving tank, said pressure signal adapted to be received by the electronic controller;

(h) wherein the electronic controller is adapted to store a tank rated density and the temperature and pressure signals;

(i) wherein the electronic controller is adapted to periodically calculate a density of the gas in the receiving tank based on the temperature and pressure signals; and (j) wherein the electronic controller is adapted to periodically compare the density of the gas in the receiving tank with the tank rated density and initiate flow of pressurized gas through the valve by generating the valve signal when the density of gas in the receiving tank is below the tank rated density and terminate flow of pressurized gas through the valve by generating the valve signal, when the density of the gas in the receiving tank reaches the tank rated density.

2. The system for dispensing pressurized gas of claim 1, wherein the pressurized gas is hydrogen gas.

3. The system for dispensing pressurized gas of claim 1, wherein the electronic controller is adapted to generate a percent full signal, wherein the percent full signal is the ratio of the density of gas in the receiving tank to the tank rated density.

4. The system for dispensing pressurized gas of claim 1, including a refrigeration system for cooling the gas exiting the pressurized gas source prior to the gas entering the receiving tank.

5. The system for dispensing pressurized gas of claim 4, wherein the refrigeration system is a mechanical refrigeration cycle.

6. The system for dispensing pressurized gas of claim 5, wherein the refrigeration system uses a hydrofluorocarbon.

7. The system for dispensing pressurized gas of claim 4, wherein the refrigeration system includes a liquid hydrogen source and a cold storage device, wherein the cold-storage device is cooled by hydrogen from the liquid hydrogen source and the refrigeration system includes a heat exchanger adapted to receive and cool said pressurized gas exiting said pressurized gas source prior to its flowing to said receiving tank.

8. The system of claim 7, wherein the cold storage device uses a condensable refrigerant to store the refrigeration until cooling is needed when filling the receiving tank.

9. The system of claim 8, wherein the refrigerant is a hydrofluorocarbon.

10. The system of claim 7, wherein the cold storage device uses argon.

11. The system of claim 7, wherein the cold storage device uses nitrogen.

12. The system of claim 7, wherein the refrigeration system includes a refrigerated container that at least partially surrounds the pressurized gas source.

13. The system of claim 1, wherein the electronic controller is adapted to calculate the density of the gas in the receiving tank based on estimated temperature and pressure signals.

14. A method for dispensing pressurized gas, comprising the steps of:

(a) providing a pressurized gas source;

(b) providing a receiving tank;

(c) providing a sealed gas flow line connected between the gas source and the receiving tank;

(d) providing a valve in the gas flow line for initiating and terminating flow of the pressurized gas between the gas source and the receiving tank, the valve operable by a valve signal;

(e) providing an electronic controller;

(f) providing a temperature sensor for sensing temperature of a gas inside the receiving tank, the temperature sensor including a temperature signal generator for generating a temperature signal corresponding to the temperature of the pressurized gas in the receiving tank, the temperature signal adapted to be received by the electronic controller;

(g) providing a pressure sensor for sensing pressure of a gas inside the receiving tank, the pressure sensor including a pressure signal generator for generating a pressure signal corresponding to the pressure of the gas inside the receiving tank, the pressure signal adapted to be received by the electronic controller;

(h) storing a tank rated density and the temperature and pressure signals in the electronic controller;

(i) periodically calculating a density of the gas in the receiving tank based on the temperature and pressure signals;

(j) periodically comparing the density of the gas in the receiving tank with the tank rated density;

(k) initiating flow of pressurized gas through the valve by generating the valve signal when the density of gas in the receiving tank is below the rated density; and (l) terminating flow of pressurized gas through the valve by generating the valve signal when the density of the gas in the receiving tank reaches the rated density.

15. The method for dispensing pressurized gas of claim 14, including the step of generating a percent full signal, wherein the percent full signal is the ratio of the density of gas in the receiving tank to the rated density.

16. The method for dispensing pressurized gas of claim 14, including the step of cooling the gas exiting the pressurized gas source prior to the gas entering the receiving tank using a refrigeration system.

17. The method for dispensing pressurized gas of claim 16 wherein the step of cooling includes using a liquid hydrogen source.

18. The method for dispensing pressurized gas of claim 14, wherein the step of calculating the density of the gas in the receiving tank is based on estimated temperature and pressure signals.

19. The method for dispensing pressurized gas of claim 14, wherein the step of calculating the density of the gas in the receiving tank includes obtaining temperature sensor and the pressure sensor readings by calculating estimated values based on an estimate of density and flow of gas exiting the pressurized gas source.

* * * * *